M. J. ROBERTS.
APPARATUS FOR OILING WOOL, &c.
No. 48,351. Patented June 20, 1865.
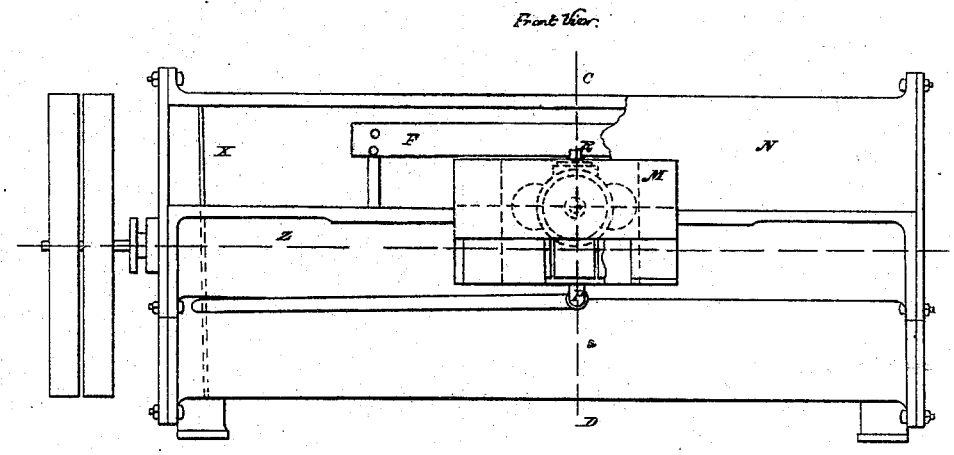
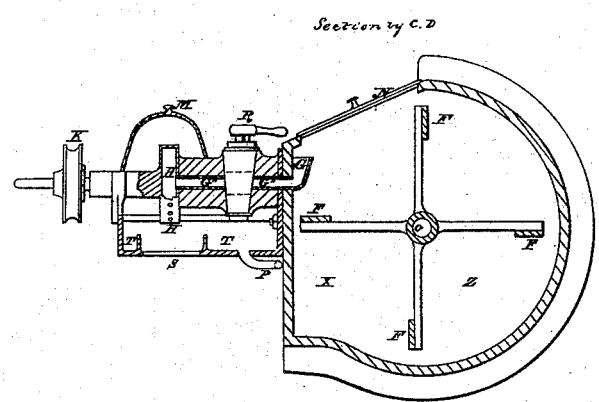
Witnesses,
Inventor,

UNITED STATES PATENT OFFICE.

MARTYN J. ROBERTS, OF PENDARREN HOUSE, CRICKHOWELL, SOUTH WALES, ENGLAND.

IMPROVEMENT IN APPARATUS FOR OILING WOOL, &c.

Specification forming part of Letters Patent No. 48,351, dated June 20, 1865.

*To all whom it may concern:*

Be it known that I, MARTYN JOHN ROBERTS, of Pendarren House, Crickhowell, South Wales, England, have invented a certain new and useful Improvement in Machinery or Apparatus for Sprinkling Liquids Over Wool, Cotton, Cloth, Linen, or other Substances; and I do hereby declare that the following is a full, clear, and exact description of the same, reference being made to the accompanying drawings, making a part of this specification, and to the letters of reference marked thereon.

My improvements consist in the use of a reservoir, 3, into which I place oil or oil and water or other liquid, which is to be sprinkled over wool or other material, and through this reservoir passes a shaft, O, upon which are fixed arms F F F F, and their blades or strips of wood reaching across from one arm to another in the direction of the length of the reservoir. By causing this shaft to revolve at a sufficient velocity (which, in a machine of the size shown in the drawings, will be about one hundred and twenty turns per minute) the liquid within the reservoir is well mixed together, while at the same time the revolving blades raise the water above its level, when in a quiet state, sufficiently high to cause some of the liquid to fall into a trough or gutter, G. This gutter conducts the liquid to an opening in the back part of a stop-cock, R G', and from this the liquid runs through the stop-cock, which can be turned to regulate the quantity of liquid flowing through it, and passes on to a tube, G'', revolving within the mouth of the stop-cock; and to this tube, and communicating with it internally, is fixed either a hollow disk, H H, or a hollow cross-head. Holes are perforated either in the outer ends of the cross-head or in the periphery of the hollow disk, and it is through these holes the liquid passes out. This disk is furnished with a shaft and pulley, K, for the purpose of turning it rapidly by means of a band or belt over the pulley from a driving-wheel in the usual manner. That shown in the drawings is generally turned at from six hundred to eight hundred revolutions per minute; and by this rapid rotation the liquid is thrown out of the small holes in the disk with great force, and passes in the form of spray or fine rain through a slot or opening, S, which is made in a pan or small reservoir, T T, placed below this disk. The length and position of this opening S regulates the distance and place upon which the liquid is sprinkled upon the wool or other substance which may be beneath it. This wool, &c., is generally laid upon a traveling apron in the manner usual in willows and carding-engines.

The pan I I and the disk H H are covered by a roof, M, which prevents any liquid that does not pass through the opening S from being thrown off and wasted, for the liquid caught by the roof is conveyed back again into the reservoir Z by a pipe, P, which communicates both with the pan and the reservoir. The open end of this pipe within the reservoir is protected from the undulations of the liquid within the reservoir by a partition, X, which shuts off the violent motion of the liquid stirred by the blades, and yet permits the liquid returned from the pan to pass by a small opening into the main reservoir Z. An opening, N, is made in the cover of the reservoir for the purpose of pouring liquid into it.

I claim as my sole invention—

1. A reservoir, in combination with revolving blades and a trough or gutter, the three being constructed and operating substantially as described.

2. In combination with a perforated revolving disk or sprinkler, a tube or passage-way leading to the disk, a gutter supplying liquid to the passage-way, and revolving blades for raising liquid into the gutter, all these parts being and acting in combination as described.

3. A revolving sprinkling-disk, in combination with a cover or roof and a slotted pan, all constructed and operating in combination as specified.

4. In combination with a revolving sprinkler, a roof and a slotted pan, a tube, and a reservoir provided with a partition, as described, these parts being constructed and operating in combination substantially as set forth.

5. In combination, the following parts, when constructed and operating substantially as set forth, viz: first, a reservoir provided with a gutter and a partition; second, revolving blades; third, a revolving sprinkler supplied by the gutter; fourth, a roof and slotted pan; and, fifth, a tube extending from the pan to the reservoir.

MARTYN J. ROBERTS.

Witnesses:
JEAN SANDERS,
A. STAHL.